(12) United States Patent
Ovbiagele

(10) Patent No.: US 12,159,099 B1
(45) Date of Patent: Dec. 3, 2024

(54) SYNTHETIC DOCUMENT GENERATION USING MACHINE LEARNING BASED LANGUAGE MODEL

(71) Applicant: Bench IQ, Inc., Valparaiso, IN (US)

(72) Inventor: Jimoh Ovbiagele, Toronto (CA)

(73) Assignee: BENCH IQ, INC., Valparaiso, IN (US)

( * ) Notice: Subject to any disclaimer, the term of this patent is extended or adjusted under 35 U.S.C. 154(b) by 0 days.

(21) Appl. No.: 18/620,918

(22) Filed: Mar. 28, 2024

(51) Int. Cl.
G06F 17/00 (2019.01)
G06F 40/166 (2020.01)
G06N 20/00 (2019.01)

(52) U.S. Cl.
CPC .......... *G06F 40/166* (2020.01); *G06N 20/00* (2019.01)

(58) Field of Classification Search
CPC .. G06F 40/166; G06F 16/951; G06F 16/2428; G06F 40/106; G06F 40/197; G06F 40/137; G06F 40/143; G06F 40/186; G06F 40/103; G06F 40/131; G06F 40/258; G06N 20/00; G05F 40/258

USPC ........................................................ 715/255
See application file for complete search history.

(56) References Cited

U.S. PATENT DOCUMENTS

| | | | |
|---|---|---|---|
| 2021/0248303 A1* | 8/2021 | Sirangimoorthy | .... G06F 40/106 |
| 2023/0394226 A1* | 12/2023 | Medalion | ................. G10L 17/14 |
| 2023/0419051 A1* | 12/2023 | Sabapathy | .............. G06F 40/30 |

* cited by examiner

*Primary Examiner* — Jason T Edwards
(74) *Attorney, Agent, or Firm* — Fenwick & West LLP

(57) ABSTRACT

A system generates synthetic documents from source documents. The system receives a source document and generates prompts for generating sections of a synthetic document from the source document. The system receives sections of the synthetic document based on execution of the machine learning based language model. For each of one or more portions of the synthetic document, the system determines a snippet of the source document that provides support for the portion of the synthetic document. The system sends the synthetic document for display via a user interface. The system receives a request via the user interface to inspect a portion of the synthetic document. The system identifies a snippet of the source document corresponding to the portion of the synthetic document and sends the snippet of the source document for display via the user interface.

18 Claims, 9 Drawing Sheets

Fig. 8

SYNTHETIC DOCUMENT GENERATION USING MACHINE LEARNING BASED LANGUAGE MODEL

BACKGROUND

The disclosure relates in general to generative artificial intelligence, and more specifically to document generation using machine learning based language models.

Generative artificial intelligence (AI) techniques are being increasingly used for automatically generating natural language descriptions in various contexts. These techniques include large language models such as Generative Pretrained Transformer (GPT) models that are trained on large corpuses of documents including books, knowledge sources such as Wikipedia™, and other data obtained by crawling the internet. Such language models are trained to generate natural language text as well as structured or semi structured text such as programs using various programing languages such as Python, Java, or data represented using JSON (JavaScript Object Notation). Large language models often exhibit hallucinations by generating false or misleading information. As a result, natural language text generated by such large language model is inadequate for domains where highly accurate information is required. Furthermore, large language models have very large number of parameters and are therefore difficult to retrain frequently. Accordingly, the knowledge of the large language model may get outdated for fields where information keeps changing and accuracy of results requires use of latest information.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 8 shows a screenshot of a user interface displaying a synthetic document and allowing user to view portions of the transcript corresponding to portions of the synthetic document in accordance with an embodiment.

Figure 1:
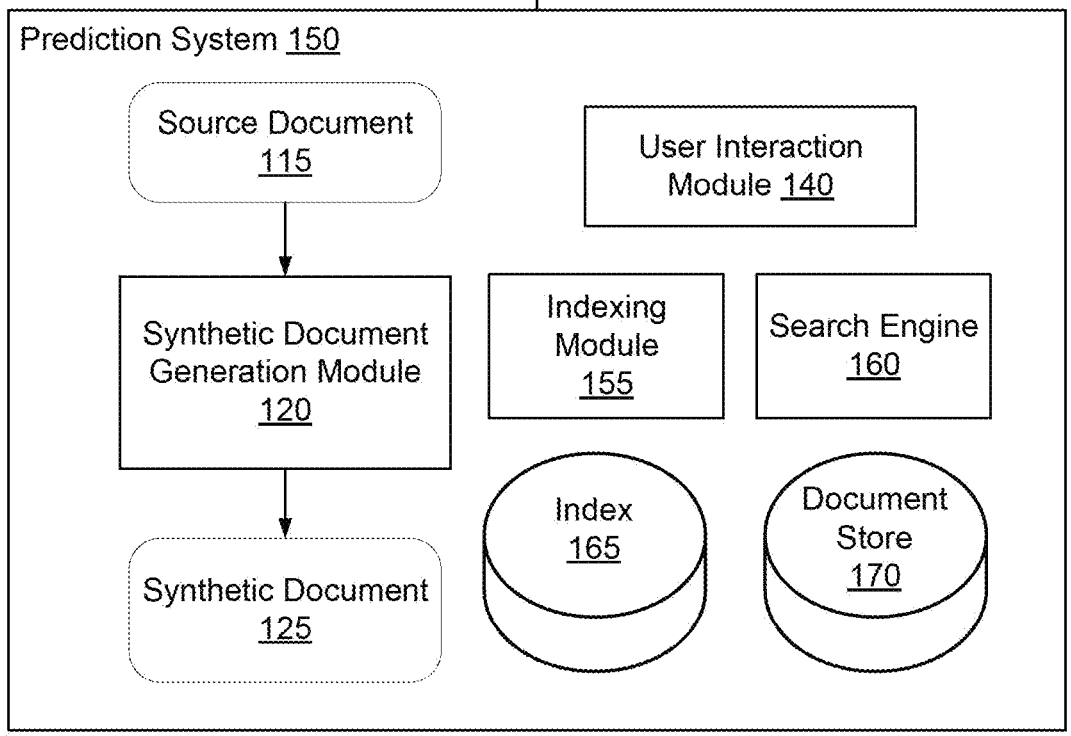
FIG. 1 shows the overall system environment for synthetic document generation, in accordance with an embodiment of the invention.

Embodiments of the invention include methods described herein, a non-transitory computer readable storage medium storing instructions for performing steps of the methods disclosed herein, and systems comprising processors and computer readable non-transitory storage medium to perform steps of the methods disclosed herein.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

A system generates synthetic documents from source documents using machine learning based language models. For example, an input document may represent a transcript of interactions between two or more parties, and the system generates a synthetic document that reflects a third party's opinion of the user interaction. Each party may correspond to one or more persons. The interactions may represent a conflict between two or more parties and the synthetic document may represent a resolution of the conflict according to a third party. The techniques disclosed herein may be applied to other types of user interactions. The transcript may be generated from an audio recording of the user interactions, for example, using an audio signal to text converter. The system ensures that the synthetic document is based on accurate information, for example, any statements made in the synthetic document are supported by portions of the source document. The system allows users to search through the synthetic documents and view them. The system configures and presents a user interface that allows users to inspect individual portions of the source document by displaying the corresponding portions of the source document that provides support for the statement in the synthetic document.

According to an embodiment, the system receives a source document and generates one or more prompts for generating sections of a synthetic document from the source document. The system provides the one or more prompts to a machine learning based language model and receives one or more sections of the synthetic document based on execution of the machine learning based language model. For each of one or more portions of the synthetic document, the system determines a snippet of the source document that provides support for the portion of the synthetic document. The system sends the synthetic document for display via a user interface. The system receives a request via the user interface to inspect a portion of the synthetic document. The system identifies a snippet of the source document corresponding to the portion of the synthetic document and sends the snippet of the source document for display via the user interface.

The system provides a technological solution that improves the current technology of generating text information using generative AI. For example, conventional large language models have a problem of hallucinations, whereby the large language model generates misleading and incorrect information. Such information is inacceptable for certain domains. For example, a third-party that resolves conflicts described in a transcript must base any conclusions on information described in the transcript or else the conflict resolution may be incorrect. The system ensures that the synthetic document is based on accurate information available in the transcript represented by the source document used for generating the synthetic document. Accordingly, the system improves the accuracy of the automatic text generation process.

The system further verifies accuracy of any information added by the large language model that is not included in the source document by accessing external sources of information. The system further improves the technology of user interfaces by providing easy access to information needed for reviewing the synthetic document. Accordingly, the system provides access to sources of data/information that provide support for any statement included in the synthetic document to allow a reviewer to verify or make an independent judgment regarding the accuracy of the statement.

FIG. 1 shows the overall system environment for synthetic document generation, in accordance with an embodiment of the invention. The overall system environment in includes one or more client devices 130, a prediction system 150, and a network 110. Other embodiments can use more or fewer or different systems than those illustrated in FIG. 1. Functions of various modules and systems described herein can be implemented by other modules and/or systems than those described herein.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130" and/or "130" in the figures).

Figure 2:
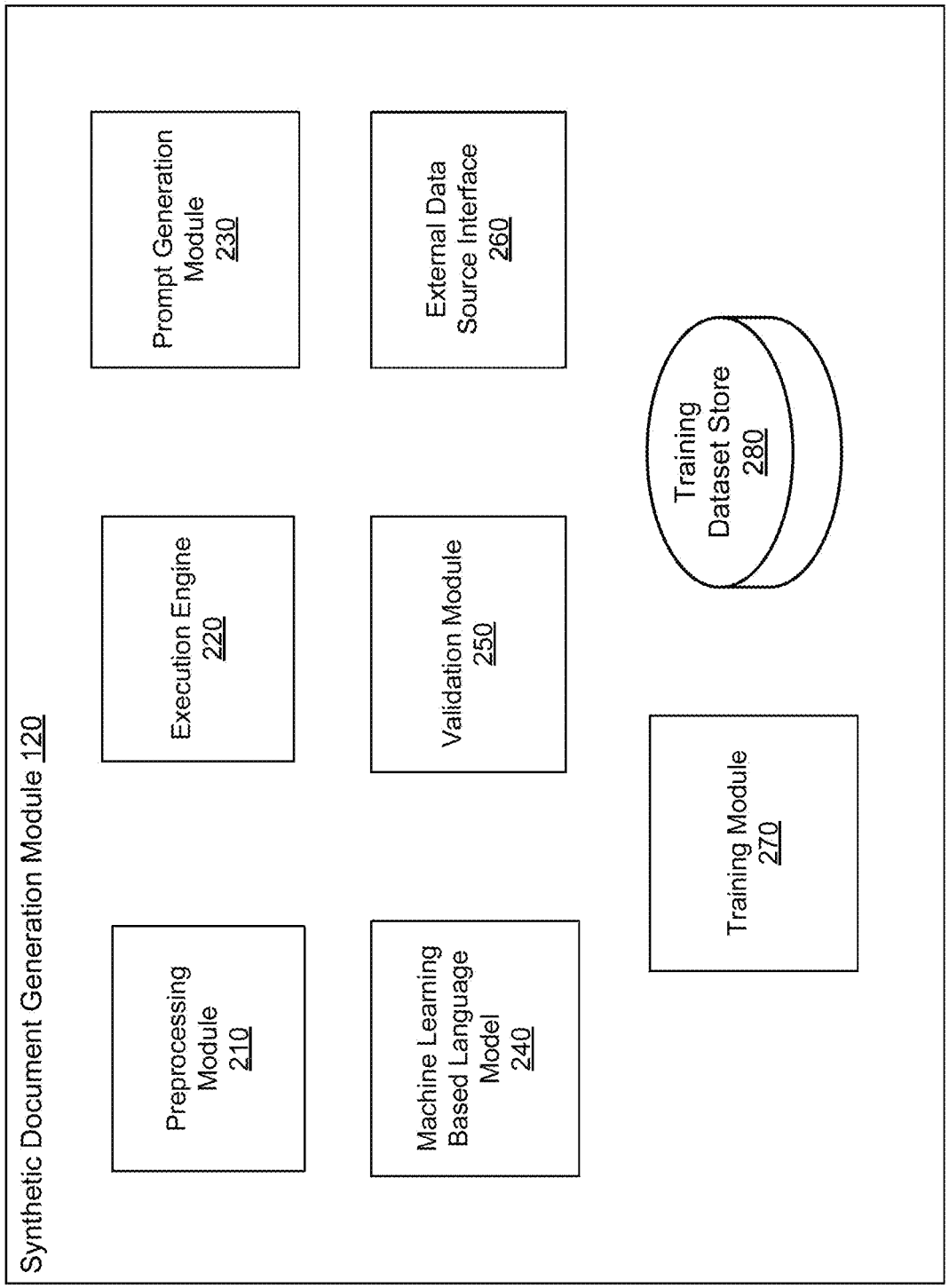
FIG. 2 shows the system architecture of a synthetic document generation module of the prediction system, in accordance with an embodiment.

The prediction system 150 includes a document generation module 120, a user interaction module 140, an indexing module 155, a search engine 160, and a document store 170. Other embodiments may include more or fewer modules than those indicated in FIG. 1. Further details of the document generation module 120 are illustrated in FIG. 2 and described in connection with FIG. 2.

The document generation module 120 receives as input a source document 115 and uses machine learning based language models to generate a synthetic document 125. According to an embodiment, the source document includes a transcript of interactions between a plurality of users and the synthetic document represents a report generated based on the interactions represented by the transcript. The prediction system 150 may process a large number of source documents to generate corresponding synthetic documents.

The prediction system 150 stores documents including the source documents and the synthetic documents generated in the document store 170. According to an embodiment, the prediction system 150 generates data structures, for example, indexes for allowing efficient searches in the documents stored in the document store 170.

The indexing module 155 generates indexes based on documents including the source documents and synthetic documents to allow efficient text searches. Alternatively, the prediction system 150 may generate vector representations of portions of the documents including keywords, phrases, and sentences to allow vector database searches. The vectors may represent embeddings generated by hidden layers of a neural network configured to process text input. The vectors allow semantic comparison between keywords and phrases even if there is no textual match between keywords and phrases.

The search engine 160 receives queries from users and performs searches for documents that match the query. According to an embodiment, the search engine 160 performs keywords-based search for documents that match input queries. According to an embodiment, the search engine 160 performs a semantic search for keywords or phrases that are within a threshold vector distance of an input vector representation generated from a search query. According to another embodiment, the search engine 160 performs a semantic search based on the received query. Accordingly, the search engine 160 generates a vector representation of the search query received, for example, a vector representation based on embeddings obtained from a neural network. The prediction system 150 stores vector representations of portions of the documents including synthetic documents generated using the techniques disclosed herein and source documents. The search engine 160 performs search for matching documents by identifying documents that have vectors within a threshold distance of the vector representation of the query. The system returns the matching documents as the results of the search query.

The user interaction module 140 allows users to input search queries and view documents stored in the document store 170. According to an embodiment, the user interaction module 140 configures a user interface and send for presentation via client application 135 executing on a client device. For example, the user interface may allow users to input a search query that is processed by the search engine 160. The user interaction module 140 identifies the search results provided by the search engine 160 and configures a user interface that displays the documents returned as search results. The user interaction module 140 receives user interactions with the documents presented via the user interface, for example, to request additional information regarding a portion of the synthetic document generated by the document generation module 120. According to an embodiment, the source document may be generated from an audio recording of interactions between users.

In an embodiment, the client device 130a, 130b executes a client application 135a, 135b that allows users to interact with the prediction system 150. For example, the client application 135 executing on the client device 130 may be an internet browser that interacts with web servers executing on prediction system 150 (not shown in FIG. 1).

Systems and applications shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc.

The interactions between the client devices 130 and the prediction system 150 are typically performed via a network 110, for example, via the internet. In one embodiment, the network uses standard communications technologies and/or protocols. In another embodiment, the various entities interacting with each other, for example, the prediction system 150 and the client devices 130 can use custom and/or dedicated data communications technologies instead of, or in addition to, the ones described above. Depending upon the embodiment, the network can also include links to other networks such as the Internet.

System Architecture

FIG. 2 shows the system architecture of a synthetic document generation module of the prediction system in accordance with an embodiment. The document generation module 120 includes a transcript preprocessing module 210, an execution engine 220, a prompt generation module 230, a machine learning based language model 240, a validation module 250, an external data source interface 260, a training module 270, and a training dataset store 280. In other embodiments, the document generation module 120 may include more or fewer modules than those shown in FIG. 2. Furthermore, specific functionality may be implemented by modules other than those described herein. In some embodiments, various components illustrated in FIG. 3 may be executed by different computer systems. For example, the training module 270 may be executed by one or more computer processors different from the computer processors that execute the transcript preprocessing module 210 or the prompt generation module 230. Furthermore, certain components may be executed using a parallel or distributed architecture for faster execution.

According to an embodiment, the source document includes a transcript of a conflict between two or more parties and the synthetic document represents a predicted resolution of the conflict according to a third party distinct from the two or more parties having the conflict. For example, the source document may represent a transcript of a court proceedings that records the interactions between various parties on trial as well as attorneys, witnesses, and the judge. According to an embodiment, the text of the source document may be automatically generated from audio transcripts received from an interaction such as court proceedings. The synthetic document represents a resolution of the conflict, for example, a synthetic opinion based on the transcripts. The synthetic opinion may represent the opinion of a judge based on the transcript. The synthetic opinion may be an opinion of a mediator for an arbitration wherein the transcript represents the interactions between the parties involved in the arbitration. A synthetic opinion may also be referred to herein as a bench opinion or a judicial opinion. In general, a bench opinion or a judicial opinion may be referred to herein as an opinion.

The preprocessing module 210 receives a source document and performs any preprocessing necessary before using the source document for synthetic document generation. According to an embodiment, the preprocessing module 210 removes stop words from the source document and may remove superfluous information such as line numbers, metadata, and so on. For example, if the source document is a transcript, the preprocessing module 210 keeps the dialog between various parties but removes secondary information that is not essential for the content of the dialog.

The execution engine 220 performs the processing necessary for generating various sections of the synthetic document. The execution engine 220 executes the various processes described herein for example, in FIG. 4-5 to interact with a machine learning based language model 240 to generate the synthetic document, for example, the synthetic bench opinion.

The prompt generation module 230 generates various prompts needed for providing to the machine learning based language model 240. A prompt provides information necessary to obtain any specific information from the machine learning based language model 240 in a specific format. The prompt generation module 230 is invoked by the execution engine 220 for generating prompts that the execution engine 220 sends to a machine learning based language model 240.

The machine learning based language model 240 may be stored locally in the prediction system 150 or may interface with a service available in an external system and accessed by the prediction system 150 via APIs (application programming interfaces) supported by the service. For example, the machine learning based language model 240 may be a service that provides APIs to a large language model such as a generative pretrained transformed (GPT) model that can be invoked remotely.

The validation module 250 ensures that the information included in the synthetic document that is generated is accurate. For example, if the document generation module 120 generates citations in the synthetic document, the validation module 250 ensures that the citations are accurate. As another example, if the synthetic document generated is a synthetic bench opinion that includes rules of law, the validation module 250 ensures that the laws are used and cited accurately. The validation module 250 may access external sources that describe statutes and case laws to ensure validity of the synthetic bench opinion. This is significant for generating synthetic bench opinions since statutes and case law can change over time, whereas the parameters of the machine learning based language model 240 are frozen at the time the machine learning based language model 240 was trained unless the machine learning based language model 240 is retrained on a continuous basis. Several machine learning based language models 240 such as large language models include very large number of parameters, and retraining them is a computation intensive process. As a result, the machine learning based language model 240 may be based on outdated information when the execution engine 220 executes the machine learning based language model 240 for generating synthetic documents. The validation module 250 ensures that the generated synthetic documents include accurate information.

The external data source interface 260 interfaces with external sources of data and information. For example, a prediction system 150 that generated synthetic bench opinions may access external systems that store information describing latest cases laws and statutes to verify accuracy of information generated by a machine learning based language model 240. Accordingly, the 250 may interact with external systems via the external data source interface 260 for performing validation of the information included in the synthetic document.

According to an embodiment, the prediction system 150 trains the machine learning based language model 240 locally rather than accessing an external system such as a service providing access to a GPT model. The training module 270 accesses training data stored in a training dataset store 280. For example, the training dataset store 280 may store training datasets including transcripts and corresponding opinions that were previously provided by courts. The training data may further include latest law including any recent changes to the statutes as well as case law. Users may annotate the transcripts and corresponding opinions to identify various sections of the documents and also to identify portions of the transcripts that support various portions of the opinion.

According to one or more embodiments, the document generation module 120 includes an index that comprises data structures that store information obtained from external sources, for example, a corpus of unstructured text representing recent case law and recent updates to statutes. Examples of such an index include GPT Index and LlamaIndex. The index allows the system to connect the corpus of information with the machine learning based language model 240 so that the answers to a prompt are based on the knowledge of the trained machine-learned language model as well as the information stored in the corpus. Accordingly, in the system as disclosed the answers to prompts requesting sections of the synthetic document are based on knowledge of the machine learning based language model 240 as well as the information stored in the corpus or user comments.

Figure 3:
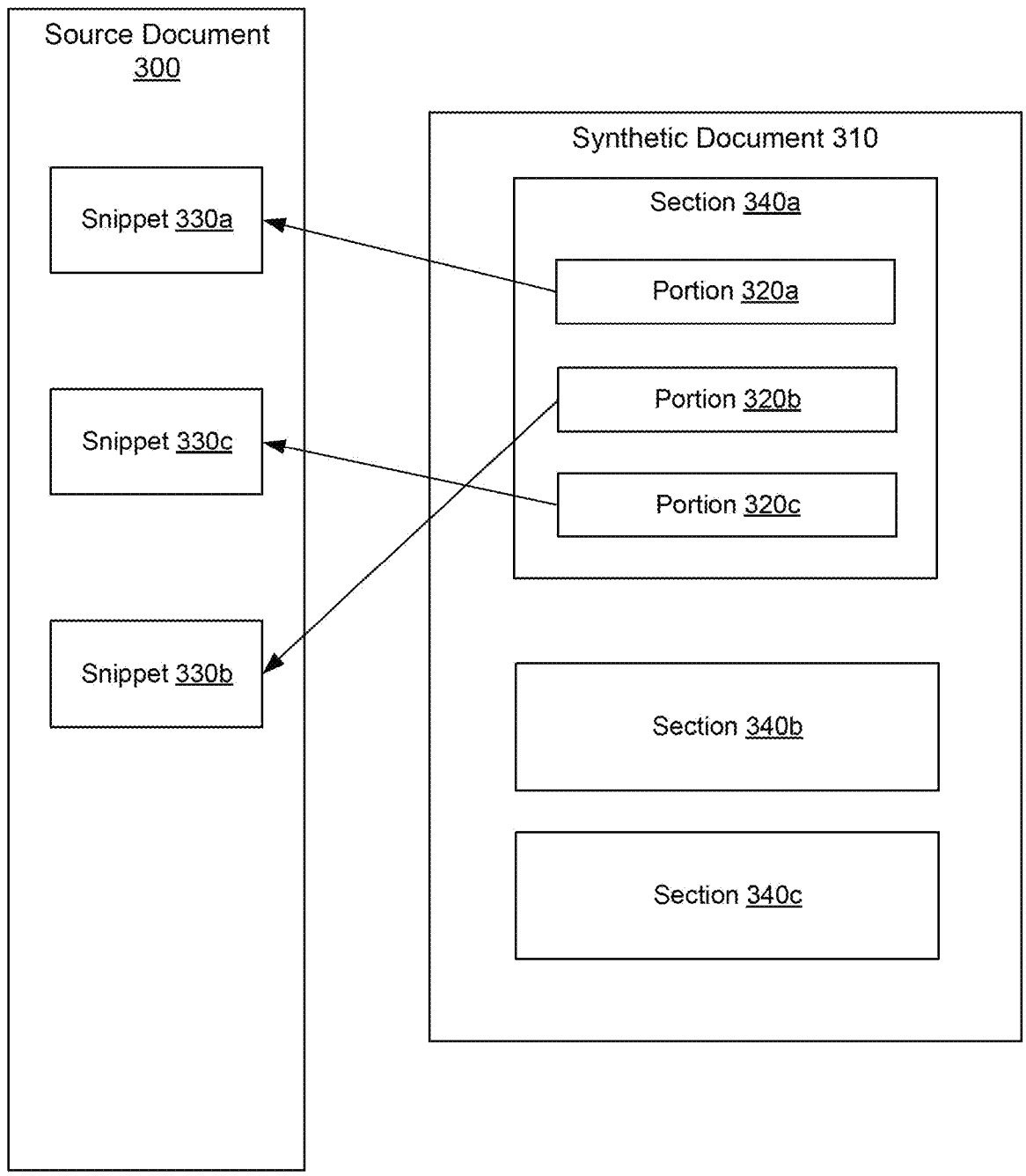
FIG. 3 is an example synthetic document generated from a source document, according to an embodiment.

FIG. 3 is an example synthetic document generated from a source document, according to an embodiment. For example, the source document 300 may be a transcript of a court proceeding and the synthetic document 310 may be an opinion, for example, a bench opinion corresponding to the transcript represented by the synthetic document 310. The synthetic document 310 may include various sections 340a, 340b, 340c, and so on. Each section may include multiple portions 320a, 320b, 320c, and so on. A portion 320 of a section 340 of the synthetic document 310 may be a sentence or represent a few consecutive sentences, for example, a paragraph. A portion of 320 of a section 340 may be supported by snippets 330 of the source document. For example, portion 320a is supported by snippet 330a, portion 320b is supported by snippet 330b, and portion 320c is supported by snippet 330c. For example, if the synthetic document 310 represents a synthetic bench opinion, the section 340a may represent a background section or a statement of the case. The various sentences of the statement of the case may represent portions 320. Each portion may be supported by one or more snippets of the transcript represented by the source document 300.

A synthetic document such as a synthetic bench opinion may include sections such as a background section, also referred to as the statement of the case that describes the procedural history and factual events of the case as described in the transcript; a statement of issues that were ruled upon by the judge; an analysis of each issue including rule applied to the issue, application of the rules, and a conclusion; a final disposition of the case indicating whether the judge approves or denies any requests; a reference section that identifies snippets of transcript that support statements in the synthetic bench opinion; and other sections. According to an embodiment, the synthetic bench opinion generated includes a citation, for example, a numeric index representing the reference.

Overall Process

FIGS. 4-7 represent various processes executed by the prediction system 150. The steps illustrated in each process may be performed in an order different from that indicated in the corresponding figure. Furthermore, the steps may be executed by modules different from those indicated herein.

Figure 4:
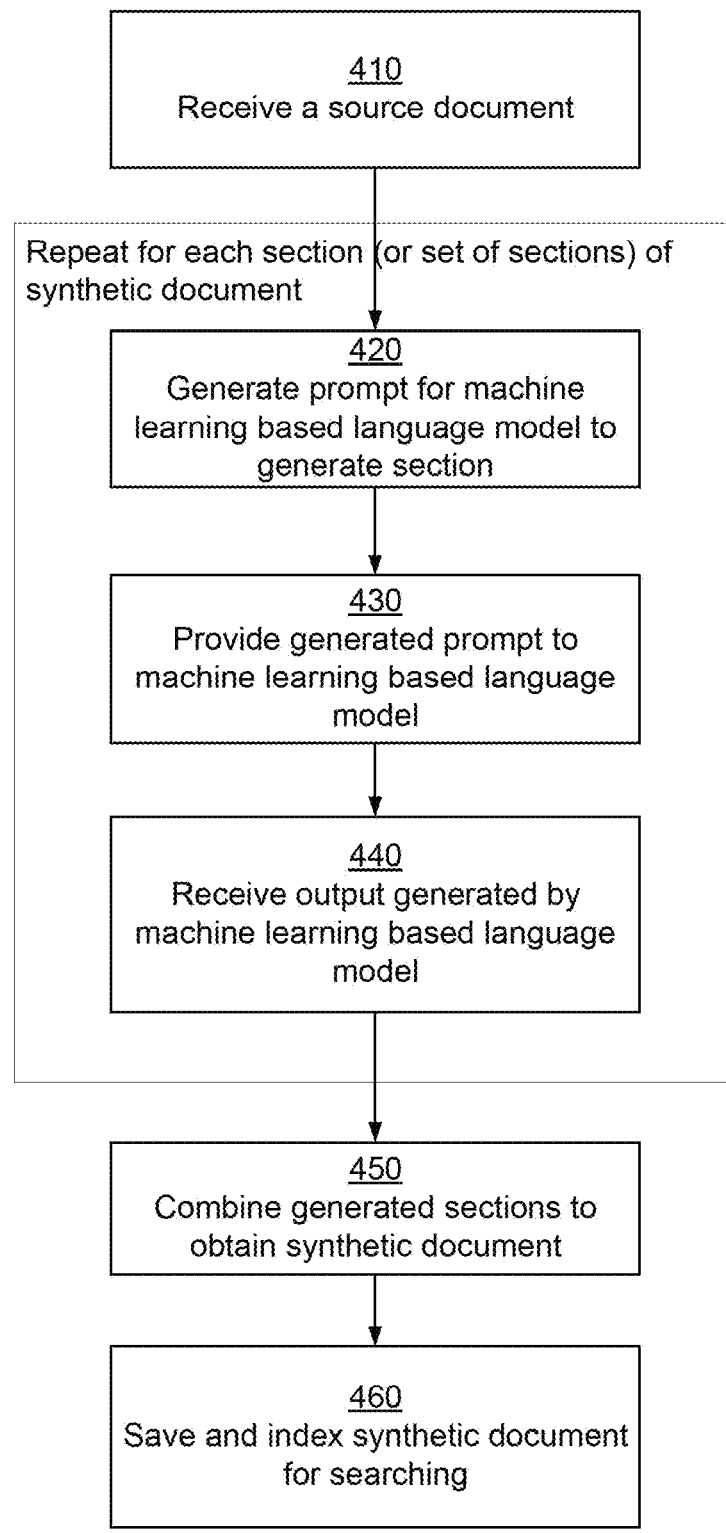
FIG. 4 illustrates the overall process for generating a synthetic document from source document using a machine learning based language models in accordance with an embodiment.

FIG. 4 illustrates the overall process for generating a synthetic document from a source document using a machine learning based language models in accordance with an embodiment. The steps may be performed by the document generation module 120. The document generation module 120 receives 410 a source document for processing. An example of a source document is a transcript representing interactions between a plurality of users, for example, a court transcript representing interactions between users such as the parties involved in a case, witnesses, attorneys, and the judge. The source document may be generated from audio transcripts of one or more sessions of user interactions, for example, audio transcripts of court proceedings of a case.

The document generation module 120 generates various sections of the synthetic document, for example, sections 340 shown in FIG. 3. The document generation module 120 repeats execution of the steps 420, 430, and 440 for each section or a set of sections of the synthetic document.

The prompt generation module 230 of the document generation module 120 generates 420 a prompt for providing to the machine learning based language model 240. According to an embodiment, the prompt generation module 230 may generate different prompts for different sections. The prompt provides instructions to the machine learning based language model 240 to generate the appropriate section and provides any necessary information needed for generating the section. For certain sections, the document generation module 120 may provide previously generated sections, i.e., sections generated by previous iterations as input to the machine learning based language model 240 for generating the next section. The prompt includes instructions about the content (describing the type of content requested), style (any type of formatting or style of the content expected), and length of the response from the machine learning based language model 240. The prompt also contains the process or instructions that the machine learning based language model 240 should follow to generate the section. An example set of instructions and process that may be included in the prompt requests the machine learning based language model 240 to 1) identify the issue, 2) identify the rules about the issue 3) identify the rules application to the facts, 4) identify the conclusion, and 5) write an explanation for the ruling the issue.

The document generation module 120 provides 430 the generated prompt as input to the machine learning based language model 240, for example, using a language model interface. If the machine learning based language model 240 is available in an external system, the document generation module 120 sends the prompt to the external system and invokes an API of the external system to execute the machine learning based language model 240. If the machine learning based language model 240 is available locally in the prediction system 150 the document generation module 120 may invoke the machine learning based language model 240, for example, by making a function call. The document generation module 120 receives 440 the output generated by the machine learning based language model 240 for each section.

The document generation module 120 combines 450 various sections generated by the machine learning based language model 240 to obtain the synthetic document, for example, the entire synthetic bench opinion based on an input transcript. The document generation module 120 saves 460 the generated synthetic document, for example, in the document store 170. According to an embodiment, the document generation module 120 indexes the generated synthetic document to allow searching through the contents of the synthetic document or to search for keywords or phrases in the synthetic document.

Although the process illustrated in FIG. 3 shows different sections being generated separately, according to an embodiment, the entire synthetic document may be generated in one iteration using a single prompt provided to the machine learning based language model 240. Accordingly, the set of sections generated by one iteration is the entire set of sections of the synthetic document. In this embodiment, the document generation module 120 generates a prompt that includes all the information needed to generate the entire synthetic document and requests the machine learning based language model 240 to generate the entire synthetic document.

Certain sections of the synthetic document may require special processing during execution of the process illustrated in FIG. 4. For example, certain specific steps may be performed to generate a background section of a synthetic bench opinion. The background section of a synthetic bench opinion is also referred to herein as the statement of the case.

Figure 5:
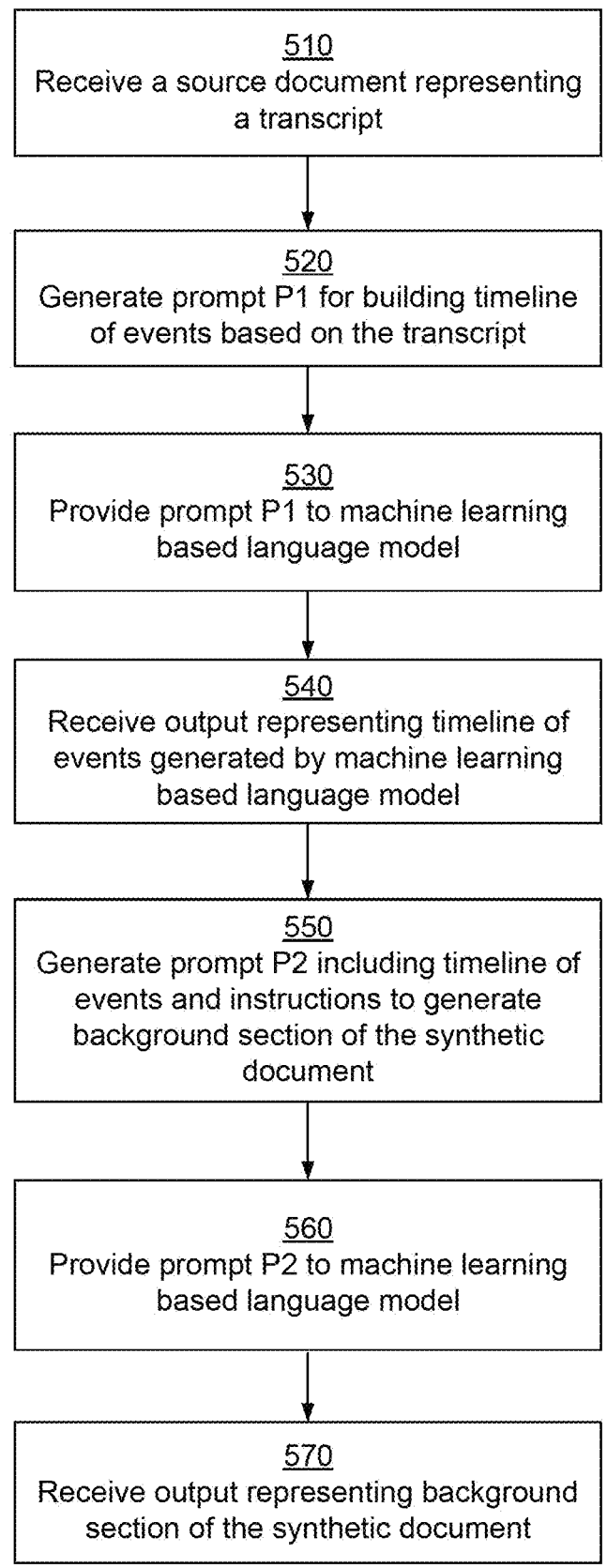
FIG. 5 illustrates the process for generating a particular section of a synthetic document from a source document using a machine learning based language model in accordance with an embodiment.

FIG. 5 illustrates the process for generating a particular section of a synthetic document from a source document using a machine learning based language model 240 in accordance with an embodiment. The steps may be performed by the document generation module 120. The document generation module 120 receives 510 a source document that represents a transcript. The prompt generation module 230 of the document generation module 120 generates 520 a prompt P1 requesting a machine learning based language model 240 to build a timeline of events based on the transcript represented by the source document. The document generation module 120 provides 530 the prompt P1 to the machine learning based language model 240, for example, using a language model interface. The document generation module 120 receives 540 the output generated by the machine learning based language model 240. The received output represents a timeline of events corresponding to the transcript represented by the source document.

The prompt generation module 230 of the document generation module 120 generates a prompt P2 that includes the generated timeline along with instructions to generate the background section (or the statement of the case) of the synthetic document. The document generation module 120 provides 550 the prompt P2 to the machine learning based language model 240, for example, using a language model interface. The document generation module 120 receives the output representing the background section of the synthetic bench opinion generated by the machine learning based language model 240. The background section is included in the synthetic bench opinion along with other sections generated by the document generation module 120.

Figure 6:
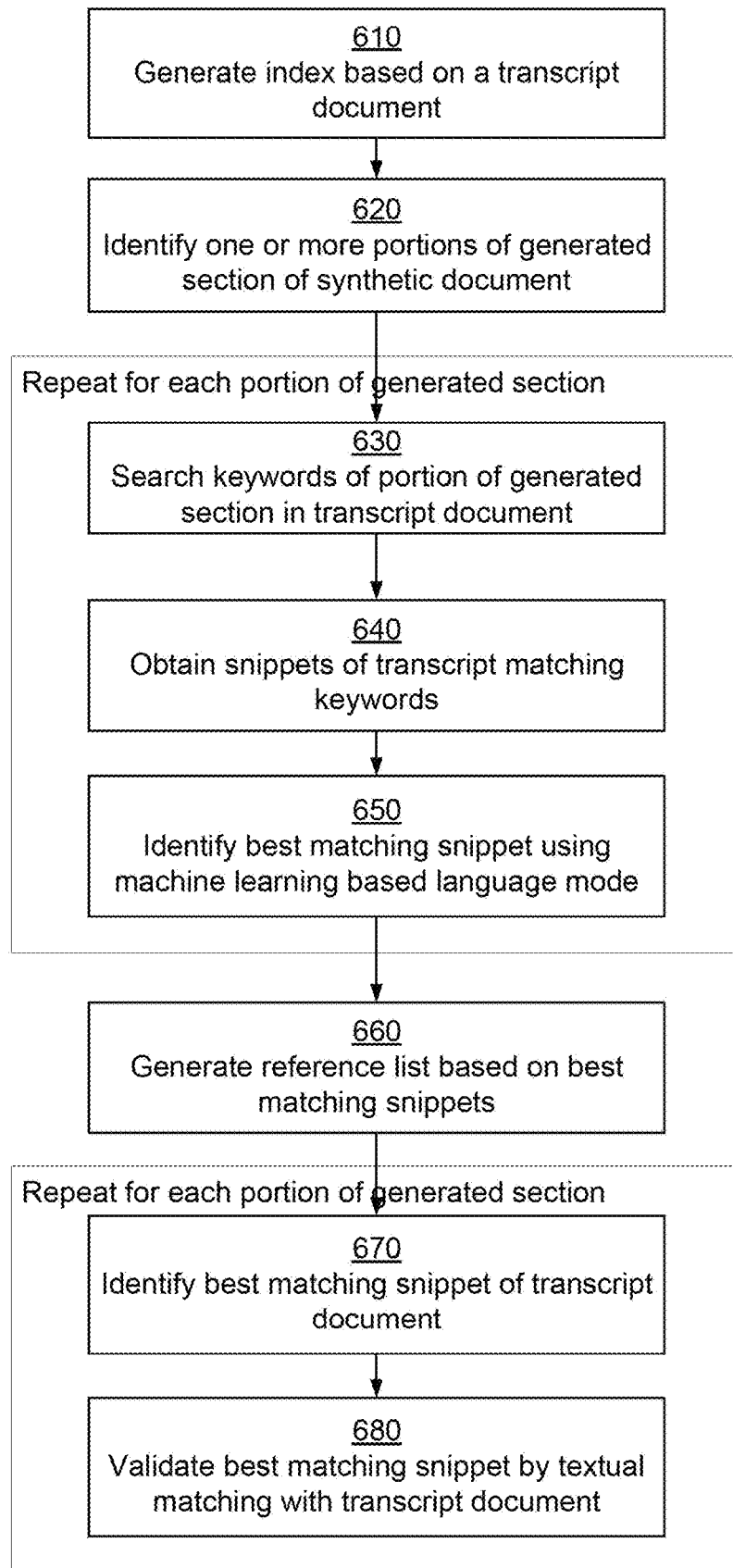
FIG. 6 illustrates the process for validating portions of synthetic documents generated from source documents using a machine learning based language model in accordance with an embodiment.

FIG. 6 illustrates the process for validating portions of synthetic documents generated from source documents using a machine learning based language model 240 in accordance with an embodiment. The process may be executed by various components of the prediction system 150. The indexing module 155 generates 610 based on the source document, for example, a TFIDF (term frequency inverse document frequency) based index to allow efficient keyword-based search. The document generation module 120 identifies 620 one or more portions of a generated section of a synthetic document. For example, the synthetic document may be a synthetic bench opinion and the section may be a statement of the case. Each portion of the generated section may be a sentence of the statement of the case of the synthetic bench opinion.

The document generation module 120 repeats the steps 630, 640, and 650 for each portion of the generated section. The document generation module 120 searches 630 for keywords of the portion of the generated section in the source document, for example, the transcript of the case. The document generation module 120 obtains 640 snippets of the transcript that match the keywords of the portion of the generated section. The document generation module 120 identifies 650 the best matching snippet using the machine learning based language model 240. For example, the document generation module 120 generates a prompt including the matching snippets and the portion of the generated section and requests the machine learning based language model 240 to identify the best matching snippet and to return no match if the machine learning based language model 240 determines that all snippets represent poor matches. If the system generates no match it is likely that the machine learning based language model 240 may have generated some values due to hallucination.

The document generation module 120 may perform sematic search instead of keyword based searches for identifying the best snippets corresponding to each portion of the synthetic document. The document generation module 120 generates a vector representation of the portion of the synthetic document, for example, vector representation based on embeddings of a neural network provided the portion as input. The document generation module 120 determines snippets of the source document having vector representations within a threshold distance of the vector representation of the portion of the synthetic document. The document generation module 120 determines a best matching snippet of the source document for the portion of the synthetic document. The system may determines the best matching snippet of the source document for the portion of the synthetic document as follows. The system generates a prompt including the snippets of the source document having vector representations within a threshold distance of the vector representation of the portion of the synthetic document and requesting the machine learning based language model to identify the best matching snippet and sends the prompt for execution to the machine learning based language model. The document generation module 120 determines the best matching snippet based on a response generated based on execution of the machine learning based language model.

The document generation module 120 generates a reference list for the synthetic document, for example, the synthetic bench opinion that identifies the best matching snippet for each portion of a particular section, for example, the statement of the case.

The document generation module 120 repeats the steps 670 and 680 for each portion of the generated section. The document generation module 120 identifies 670 the best matching snippet of the transcript document corresponding to each portion of the generated section as determined by the machine learning based language model 240. The document generation module 120 validates 680 the best matching snippet by performing a textual matching of the best matching snippet against the source document to make sure that the best matching snippet does exist in the source document.

User Interactions with Synthetic Documents

The synthetic documents generated, for example, synthetic bench opinions are provided to users via a user interface that allows users to view various sections of the synthetic document as well as portions of the transcript represented by the source document that are associated with various portions of the synthetic documents as illustrated in FIG. 3.

Figure 7:
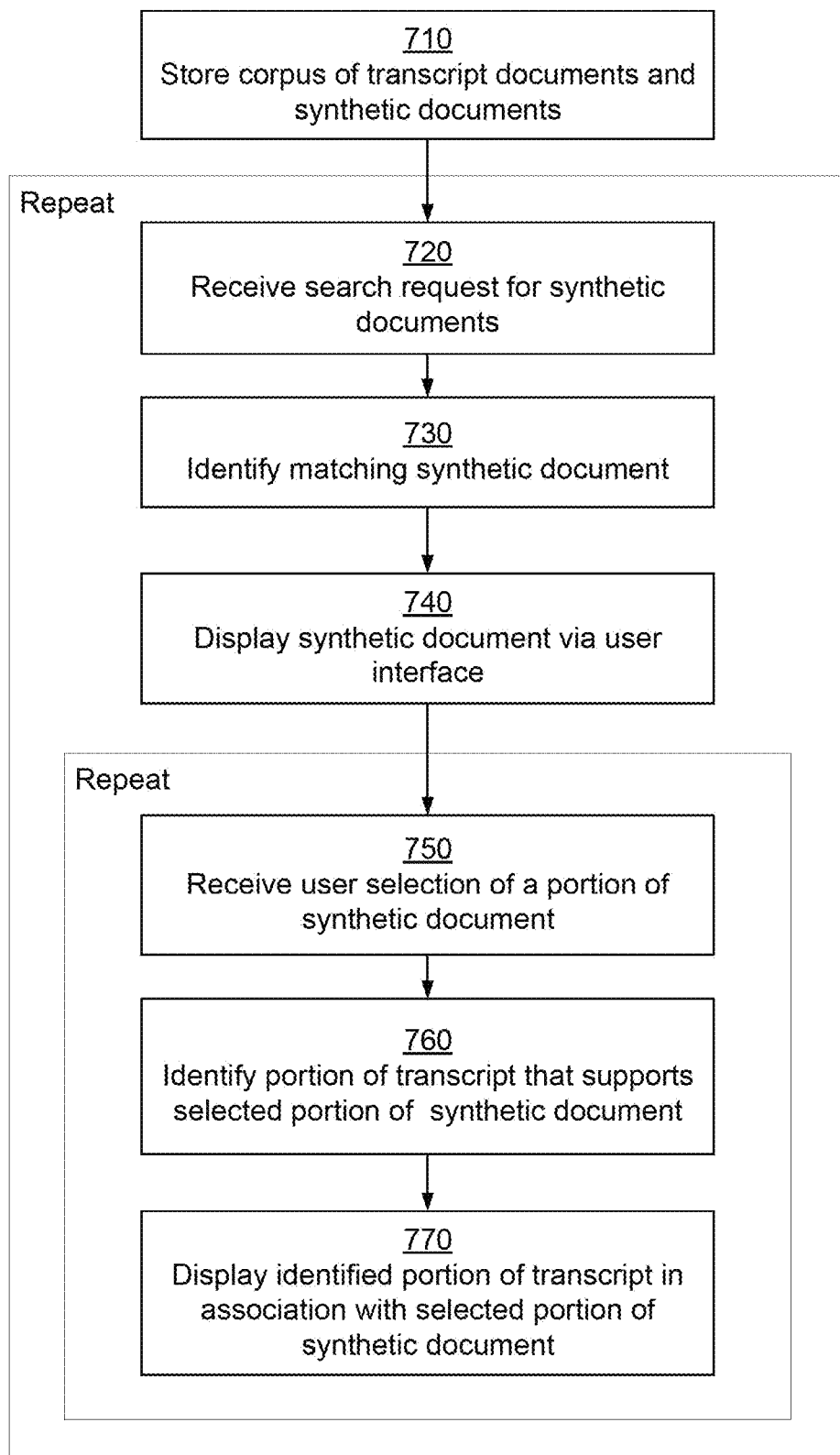
FIG. 7 illustrates user interactions performed with a synthetic document via a user interface in accordance with an embodiment.

FIG. 7 illustrates user interactions performed with a synthetic document via a user interface in accordance with an embodiment. The prediction system 150 stores a corpus of the source documents and their corresponding synthetic documents that are generated using the machine learning based language model 240. The corpus may be stored in the document store 170. The indexing module 155 generates indexes for allowing searches through documents stored in the document store 170.

The prediction system 150 repeats the following steps 720, 730, 740 for each search request received from a user for example, via a user interface of a client application 135 running on a client device 130. The user requests may be received via the user interaction module 140 and processed by invoking the appropriate module of the prediction system 150 for example, the search engine 160.

Accordingly, the search engine 160 of the prediction system 150 receives 720 a search request via a user interface of a client application 135 running on a client device 130. The search engine 160 uses the index 165 of the documents stored in the document store 170 to find matching synthetic documents based on the search request. The search engine 160 may display one or more synthetic documents that match the search request, and the user may select a synthetic document returned by the search engine 160. The prediction system 150 displays 740 the selected synthetic document to the user via the user interface.

The prediction system 150 repeats the steps 750, 760, and 770 for each user interaction received from the user in relation to the synthetic document presented to the user via the user interface. The prediction system 150 receives 750 a user selection of a portion of the synthetic document, for example, selection of a sentences of a statement of a case of a synthetic bench opinion. The prediction system 150 identifies 760 a corresponding portion of the source document, for example, a best matching snippet of a transcript from which the synthetic bench opinion was generated. The user interaction module 140 of the prediction system 150 displays 770 of the identified portion of the source document in association with the selected portion of the synthetic document using a widget of the user interface, for example, as a slide out panel. This provides the user with the information of the source document used to generate a specific portion of the synthetic document. The user may repeat these steps for different portions of the synthetic document.

Figure 8:
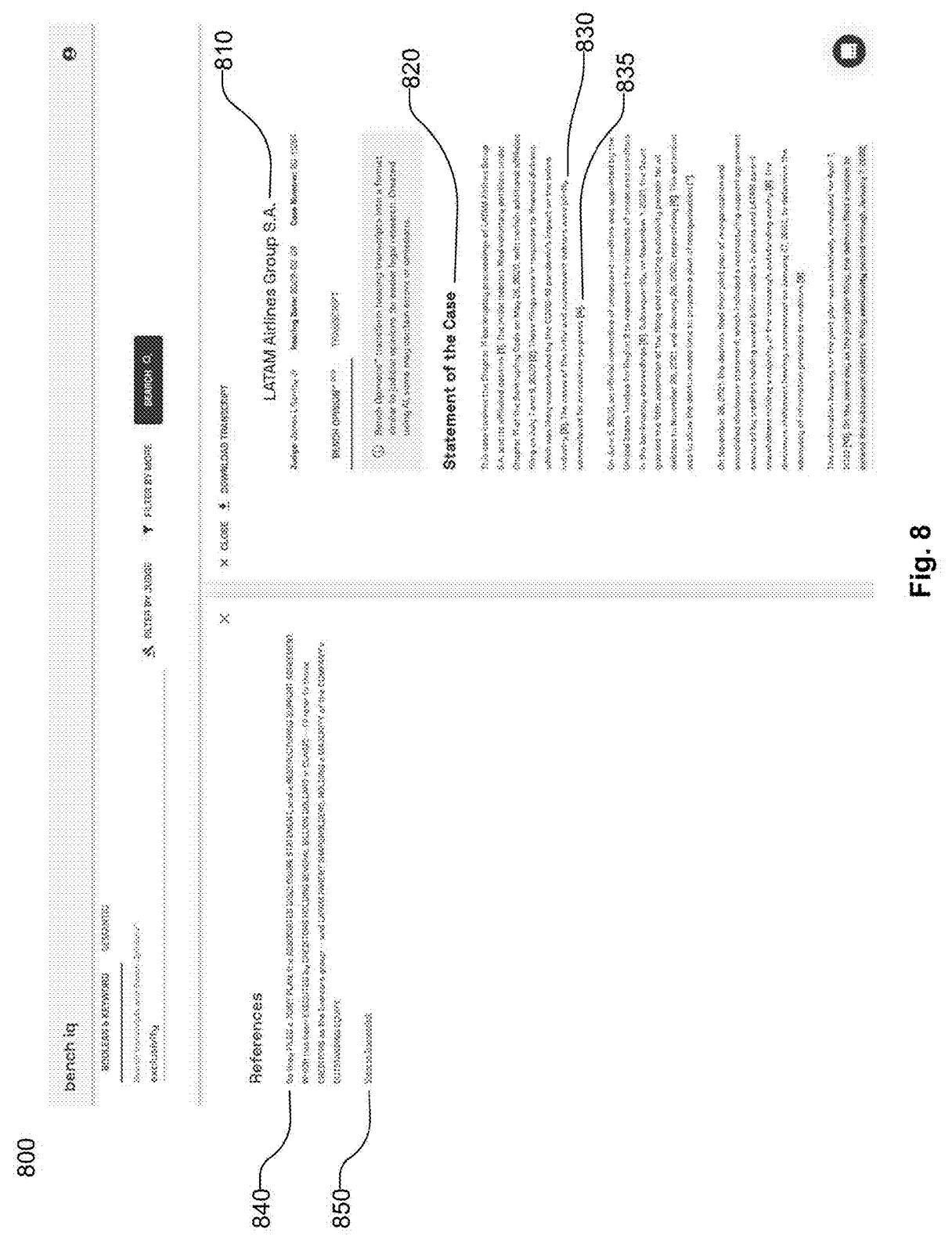

FIG. 8 shows a screenshot of a user interface 800 displaying a synthetic document and allowing user to view portions of the transcript corresponding to portions of the synthetic document in accordance with an embodiment. The user interface displays a synthetic document, for example, a synthetic bench opinion. The synthetic document may display a title, and one or more sections. An example section is the statement of the case 820 represented by the synthetic document. The section includes several portions, for example, sentences. As shown in FIG. 8, a portion 830 of the section may display a reference number, for example, a citation number 835. The user may interact with a portion 830 of the section, for example, by clicking on the citation number 835 causing the user interface to display a snippet 840 corresponding to the portion 830. A widget 850 allows the user to view the snippet 840 within the source document. Accordingly, the user interface 800 allows a user to inspect the synthetic document in the context of the source document from which the synthetic document was generated and further allows the user to identify snippets of the source document that support a specific portion of the synthetic document. Accordingly, the user interface 800 improves the user experience while viewing a synthetic document generated using a machine learning based language model 240.

Computer Architecture

Figure 9:
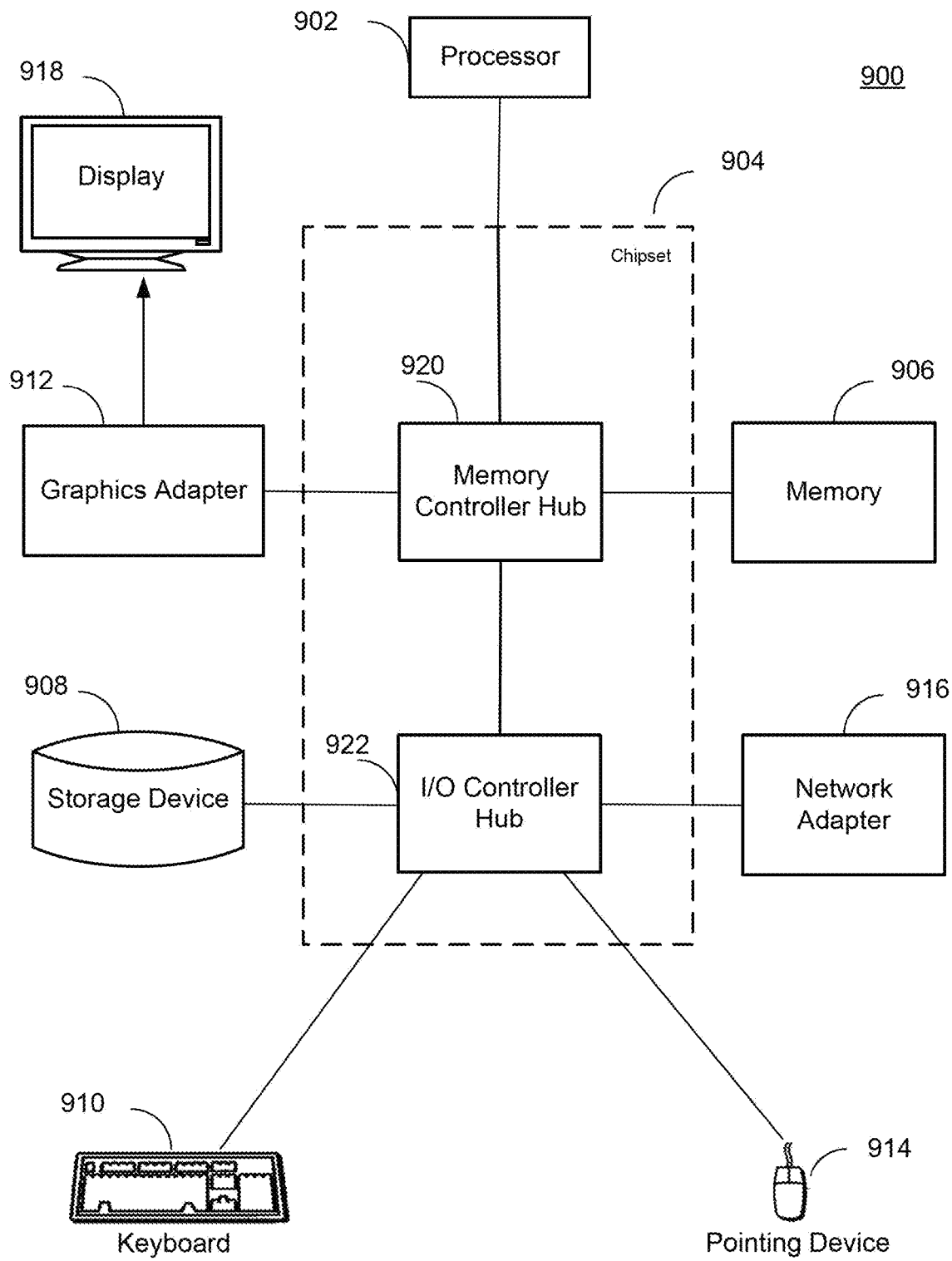
FIG. 9 is a high-level block diagram illustrating an example of a computer system in accordance with an embodiment.

FIG. 9 is a high-level block diagram illustrating an example system, in accordance with an embodiment. The computer 900 includes at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display 918 is coupled to the graphics adapter 912. A storage device 908, keyboard 910, pointing device 914, and network adapter 916 are coupled to the I/O controller hub 922. Other embodiments of the computer 900 have different architectures.

The storage device 908 is a non-transitory computer-readable storage medium such as a hard drive, compact disk read-only memory (CD-ROM), DVD, or a solid-state memory device. The memory 906 holds instructions and data used by the processor 902. The pointing device 914 is a mouse, track ball, or other type of pointing device, and is used in combination with the keyboard 910 to input data into the computer system 900. The graphics adapter 912 displays images and other information on the display 918. The network adapter 916 couples the computer system 900 to one or more computer networks.

The computer 900 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 908, loaded into the memory 906, and executed by the processor 902. The types of computers 900 used can vary depending upon the embodiment and requirements. For example, a computer may lack displays, keyboards, and/or other devices shown in FIG. 9.

ADDITIONAL CONSIDERATIONS

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method of generating synthetic documents using machine learning based language models, the method comprising:
    receiving a source document representing a transcript of user interactions associated with a conflict;
    generating one or more sections of a synthetic document based on execution of a machine learning based language model, the synthetic document representing a resolution of the conflict represented by the transcript, the generating comprising:
        generating a prompt requesting the machine learning based language model to generate a timeline of events based on the transcript,
        receiving the timeline of events based on the transcript generated by the machine learning based language model,
        generating another prompt including the timeline of events based on the transcript and requesting the machine learning based language model to generate a background section, and
        receiving the background section from the machine learning based language model;
    for each of one or more portions of the synthetic document, determining a snippet of the source document that supports the portion of the synthetic document;
    sending the synthetic document for display via a user interface;
    receiving a request via the user interface to inspect a portion of the synthetic document;
    identifying a snippet of the source document corresponding to the portion of the synthetic document; and
    sending the snippet of the source document for display via the user interface.

2. The computer-implemented method of claim 1, wherein determining a snippet of the source document that provides support for the portion of the synthetic document comprises:
    identifying one or more keywords of the portion of the synthetic document;
    determining snippets of the source document matching the one or more keywords; and
    determining a best matching snippet of the source document for the portion of the synthetic document.

3. The computer-implemented method of claim 2, wherein determining the best matching snippet of the source document for the portion of the synthetic document comprises:
    generating a prompt including the snippets of the source document matching the identified keywords and requesting the machine learning based language model to identify the best matching snippet;
    sending the prompt for execution to the machine learning based language model; and
    determining the best matching snippet based on a response generated based on execution of the machine learning based language model.

4. The computer-implemented method of claim 1, wherein determining a snippet of the source document that provides support for the portion of the synthetic document comprises:
    generating a vector representation of the portion of the synthetic document;
    determining snippets of the source document having vector representations within a threshold distance of the vector representation of the portion of the synthetic document; and
    determining a best matching snippet of the source document for the portion of the synthetic document.

5. The computer-implemented method of claim 4, wherein determining the best matching snippet of the source document for the portion of the synthetic document comprises:
    generating a prompt including the snippets of the source document having vector representations within a threshold distance of the vector representation of the portion of the synthetic document and requesting the machine learning based language model to identify the best matching snippet;
    sending the prompt for execution to the machine learning based language model; and
    determining the best matching snippet based on a response generated based on execution of the machine learning based language model.

6. The computer-implemented method of claim 1, further comprising:
  training the machine learning based language model using training data comprising source documents and target documents corresponding to the source documents, wherein a target document is annotated with labels describing sections of the target document, the training data further comprising associations between portions of the target document and snippets of the source document providing support for the portion of the target document.

7. A computer readable non-transitory storage medium, storing instructions that when executed by one or more computer processors, cause the one or more computer processors to perform steps comprising:
  receiving a source document representing a transcript of user interactions associated with a conflict;
  generating one or more sections of a synthetic document based on execution of a machine learning based language model, the synthetic document representing a resolution of the conflict represented by the transcript, the generating comprising:
    generating a prompt requesting the machine learning based language model to generate a timeline of events based on the transcript,
    receiving the timeline of events based on the transcript generated by the machine learning based language model,
    generating another prompt including the timeline of events based on the transcript and requesting the machine learning based language model to generate a background section, and
    receiving the background section from the machine learning based language model;
  for each of one or more portions of the synthetic document, determining a snippet of the source document that supports the portion of the synthetic document;
  sending the synthetic document for display via a user interface;
  receiving a request via the user interface to inspect a portion of the synthetic document;
  identifying a snippet of the source document corresponding to the portion of the synthetic document; and
  sending the snippet of the source document for display via the user interface.

8. The computer readable non-transitory storage medium of claim 7, wherein instructions for determining a snippet of the source document that provides support for the portion of the synthetic document comprise instructions for:
  identifying one or more keywords of the portion of the synthetic document;
  determining snippets of the source document matching the one or more keywords; and
  determining a best matching snippet of the source document for the portion of the synthetic document.

9. The computer readable non-transitory storage medium of claim 8, wherein instructions for determining the best matching snippet of the source document for the portion of the synthetic document comprise instructions for:
  generating a prompt including the snippets of the source document matching the identified keywords and requesting the machine learning based language model to identify the best matching snippet;
  sending the prompt for execution to the machine learning based language model; and
  determining the best matching snippet based on a response generated based on execution of the machine learning based language model.

10. The computer readable non-transitory storage medium of claim 7, wherein instructions for determining a snippet of the source document that provides support for the portion of the synthetic document comprise instructions for:
  generating a vector representation of the portion of the synthetic document;
  determining snippets of the source document having vector representations within a threshold distance of the vector representation of the portion of the synthetic document; and
  determining a best matching snippet of the source document for the portion of the synthetic document.

11. The computer readable non-transitory storage medium of claim 10, wherein instructions for determining the best matching snippet of the source document for the portion of the synthetic document comprise instructions for:
  generating a prompt including the snippets of the source document having vector representations within a threshold distance of the vector representation of the portion of the synthetic document and requesting the machine learning based language model to identify the best matching snippet;
  sending the prompt for execution to the machine learning based language model; and
  determining the best matching snippet based on a response generated based on execution of the machine learning based language model.

12. The computer readable non-transitory storage medium of claim 7, wherein the instructions further cause the one or more computer processors to perform steps comprising:
  training the machine learning based language model using training data comprising source documents and target documents corresponding to the source documents, wherein a target document is annotated with labels describing sections of the target document, the training data further comprising associations between portions of the target document and snippets of the source document providing support for the portion of the target document.

13. A computer-implemented system, comprising:
  one or more computer processors; and
  a computer readable non-transitory storage medium storing instructions thereon, the instructions when executed by the one or more computer processors cause the one or more computer processors to perform steps comprising:
    receiving a source document representing a transcript of user interactions associated with a conflict;
    generating one or more sections of a synthetic document based on execution of a machine learning based language model, the synthetic document representing a resolution of the conflict represented by the transcript, the generating comprising:
      generating a prompt requesting the machine learning based language model to generate a timeline of events based on the transcript,
      receiving the timeline of events based on the transcript generated by the machine learning based language model,
      generating another prompt including the timeline of events based on the transcript and requesting the machine learning based language model to generate a background section, and receiving the background section from the machine learning based language model;

for each of one or more portions of the synthetic document, determining a snippet of the source document that supports the portion of the synthetic document;

sending the synthetic document for display via a user interface;

receiving a request via the user interface to inspect a portion of the synthetic document;

identifying a snippet of the source document corresponding to the portion of the synthetic document; and sending the snippet of the source document for display via the user interface.

14. The computer-implemented system of claim 13, wherein determining a snippet of the source document that provides support for the portion of the synthetic document comprises:

identifying one or more keywords of the portion of the synthetic document;

determining snippets of the source document matching the one or more keywords; and determining a best matching snippet of the source document for the portion of the synthetic document.

15. The computer-implemented system of claim 14, wherein determining the best matching snippet of the source document for the portion of the synthetic document comprises:

generating a prompt including the snippets of the source document matching the identified keywords and requesting the machine learning based language model to identify the best matching snippet;

sending the prompt for execution to the machine learning based language model; and determining the best matching snippet based on a response generated based on execution of the machine learning based language model.

16. The computer-implemented system of claim 13, wherein determining a snippet of the source document that provides support for the portion of the synthetic document comprises:

generating a vector representation of the portion of the synthetic document;

determining snippets of the source document having vector representations within a threshold distance of the vector representation of the portion of the synthetic document; and determining a best matching snippet of the source document for the portion of the synthetic document.

17. The computer-implemented system of claim 16, wherein determining the best matching snippet of the source document for the portion of the synthetic document comprises:

generating a prompt including the snippets of the source document having vector representations within a threshold distance of the vector representation of the portion of the synthetic document and requesting the machine learning based language model to identify the best matching snippet;

sending the prompt for execution to the machine learning based language model; and determining the best matching snippet based on a response generated based on execution of the machine learning based language model.

18. The computer-implemented system of claim 13, further comprising:

training the machine learning based language model using training data comprising source documents and target documents corresponding to the source documents, wherein a target document is annotated with labels describing sections of the target document, the training data further comprising associations between portions of the target document and snippets of the source document providing support for the portion of the target document.

\* \* \* \* \*